US012197907B2

(12) United States Patent
Jepperson et al.

(10) Patent No.: US 12,197,907 B2
(45) Date of Patent: Jan. 14, 2025

(54) SOFTWARE FEATURE PRIORITIZATION USING BLOCKCHAIN

(71) Applicant: INTERNATIONAL BUSINESS MACHINES CORPORATION, Armonk, NY (US)

(72) Inventors: Jacob Ryan Jepperson, St. Paul, MN (US); Zachary A. Silverstein, Georgetown, TX (US); Jeremy R. Fox, Georgetown, TX (US); Spencer Thomas Reynolds, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 237 days.

(21) Appl. No.: 18/076,233

(22) Filed: Dec. 6, 2022

(65) Prior Publication Data
US 2024/0184560 A1 Jun. 6, 2024

(51) Int. Cl.
*G06F 8/65* (2018.01)
*G06Q 20/36* (2012.01)

(52) U.S. Cl.
CPC .............. *G06F 8/65* (2013.01); *G06Q 20/36* (2013.01)

(58) Field of Classification Search
CPC .......... G06Q 20/36; G06N 20/00; G06F 8/65; G06F 8/00–77
See application file for complete search history.

(56) References Cited

U.S. PATENT DOCUMENTS

| 8,549,527 | B2 * | 10/2013 | Bagheri | .................... | G06F 9/46 |
| | | | | | 718/103 |
| 8,813,086 | B2 * | 8/2014 | Bagheri | .................... | G06F 9/46 |
| | | | | | 718/103 |

(Continued)

FOREIGN PATENT DOCUMENTS

WO 2013109992 A2 7/2013

OTHER PUBLICATIONS

Merten, Thorsten, et al. "Software feature request detection in issue tracking systems." 2016 IEEE 24th international requirements engineering conference (RE). IEEE, 2016. (Year: 2016).*

(Continued)

*Primary Examiner* — Matthew J Brophy
(74) *Attorney, Agent, or Firm* — CUENOT, FORSYTHE & KIM, LLC

(57) ABSTRACT

A computer hardware system includes a machine learning engine and a hardware processor configured to perform the following executable operations. A stake in a software product is converted into feature development tokens to be stored in the digital wallet. A description of a plurality of proposed product features for the software product and previously-stored within a blockchain are forwarded to a usage user via a usage user portal. A plurality of the feature development tokens are allocated, using the usage user portal, to a selected one of the proposed product features. The digital wallet and the blockchain are updated based upon the allocating. An objective analysis is performed on the plurality of proposed product features using the machine learning engine. The blockchain is updated based upon a delivered one of the plurality of the proposed product features.

25 Claims, 3 Drawing Sheets

(56) References Cited

U.S. PATENT DOCUMENTS

| | | | | |
|---|---|---|---|---|
| 9,383,976 | B1* | 7/2016 | Singh | H04L 12/1822 |
| 9,588,760 | B1* | 3/2017 | Bostick | G06F 8/71 |
| 9,870,591 | B2* | 1/2018 | Shah | G06F 40/30 |
| 10,521,215 | B2* | 12/2019 | Zander | G06F 8/65 |
| 11,250,445 | B2* | 2/2022 | Jobin | G06Q 30/0201 |
| 11,520,566 | B2* | 12/2022 | Iley | G06F 16/148 |
| 11,721,090 | B2* | 8/2023 | Deng | G06F 18/241 |
| | | | | 706/15 |
| 11,922,143 | B1* | 3/2024 | Shapiro | G06F 8/35 |
| 12,079,616 | B2* | 9/2024 | Cain, Jr. | G06F 8/61 |
| 2007/0192170 | A1* | 8/2007 | Cristol | G06Q 10/0639 |
| | | | | 705/7.23 |
| 2012/0054761 | A1* | 3/2012 | Bagheri | G06Q 10/06 |
| | | | | 718/103 |
| 2013/0290132 | A1* | 10/2013 | DeLuca | G06Q 30/04 |
| | | | | 705/40 |
| 2013/0339970 | A1* | 12/2013 | Bagheri | G06Q 10/06 |
| | | | | 718/103 |
| 2014/0068545 | A1* | 3/2014 | Lehmann | G06Q 10/103 |
| | | | | 717/101 |
| 2014/0258970 | A1* | 9/2014 | Brown | G06F 8/47 |
| | | | | 717/103 |
| 2016/0155161 | A1* | 6/2016 | Reisman | G06Q 30/0601 |
| | | | | 705/26.1 |
| 2016/0173404 | A1* | 6/2016 | Pouyllau | H04L 67/51 |
| | | | | 709/226 |
| 2017/0103472 | A1* | 4/2017 | Shah | H04L 9/32 |
| 2017/0168809 | A1* | 6/2017 | Zander | G06F 8/35 |
| 2017/0351506 | A1* | 12/2017 | Celikyilmaz | G06F 8/70 |
| 2023/0177015 | A1* | 6/2023 | Madisetti | G06F 40/289 |
| | | | | 707/608 |
| 2023/0261876 | A1* | 8/2023 | Kumar | H04L 9/3247 |
| | | | | 713/168 |
| 2023/0385042 | A1* | 11/2023 | Obando Chacon | G06F 8/447 |
| 2023/0393833 | A1* | 12/2023 | Cain, Jr. | H04L 9/3247 |
| 2024/0184560 | A1* | 6/2024 | Jepperson | G06N 20/00 |

OTHER PUBLICATIONS

Baygin, Nursena, Mehmet Baygin, and Mehmet Karakose. "DesignChain: A smart contract-based customized production model." 2020 Zooming Innovation in Consumer Technologies Conference (Zinc). IEEE, 2020. (Year: 2020).*

Farooq, Muhammad Shoaib, et al. "A blockchain-based framework for distributed agile software development." IEEE Access 10 (2022): 17977-17995. (Year: 2022).*

Chen, Po-Wei, Bo-Sian Jiang, and Chia-Hui Wang. "Blockchain-based payment collection supervision system using pervasive Bitcoin digital wallet." 2017 IEEE 13th international conference on wireless and mobile computing, networking and communications (WiMob). IEEE, 2017. (Year: 2017).*

Kaynak, B. et al., "Cloud Manufacturing Architecture Based on Public Blockchain Technology", IEEE Access, Dec. 25, 2019, vol. 8, pp. 2163-2177, IEEE.

"About Quirky," [online] Quirky © 2022 [retrieved Jul. 28, 2022], retrieved from the Internet: <https://quirky.com/about-quirky/>, 5 pg.

"IBM Robotic Process Automation—Overview," [online] IBM Products [retrieved Jul. 28, 2022], retrieved from the Internet: <https://www.ibm.com/products/robotic-process-automation?utm_content=SRCWW&p1=Search&p4-43700064659064419&p5=e&gclid=EAlalQobChMljr-f7Yr19AIVxCdMCh2hhQxoEAAYASAAEgIR3fD_BwE&gclsrc=aw.ds>, 14 pg.

"Kickstarter," [online] Kickstarter, PBC © 2022 [retrieved Jul. 28, 2022], retrieved from the Internet: <https://www.kickstarter.com/about?ref=global-footer>, 10 pg.

Mell, P. et al., The NIST Definition of Cloud Computing, National Institute of Standards and Technology, U.S. Dept. of Commerce, Special Publication 800-145, Sep. 2011, 7 pg.

* cited by examiner

SOFTWARE FEATURE PRIORITIZATION USING BLOCKCHAIN

BACKGROUND

The present invention relates to software development, and more specifically, to using a blockchain to prioritize feature development.

Product development teams struggle to decide what features should be prioritized during development of a product, e.g., software. For example, an open-source software product may be distributed to a client, and the software developer may asked by the client to provide certain upgrades in functionality (i.e., product features) to that software product. While technical support staff who interact with customers help translate customer needs and wants into a roadmap for prioritizing the development of new features, there is a need to provide consumers with a more interactive approach to prioritize development of new features as well as a need to provide producers an incentive to provide those features.

One known approach to software development involves crowdsourcing the software development project. This approach includes segregating the software development project into one or more modules based on at least one configuration file, which is deterministic of at least a set of dependencies between the one or more modules. A task corresponding to at least one module is created, and the task is crowdsourced to one or more crowd-workers. The source code generated by the crowd-work is then integrated without other source code to generate an integrated software package based on said at least one configuration file.

SUMMARY

A computer-implemented process within a computer hardware system having a machine learning engine includes the following executable operations. A stake in a software product is converted into feature development tokens to be stored in the digital wallet. A description of a plurality of proposed product features for the software product and previously-stored within a blockchain are forwarded to a usage user via a usage user portal. A plurality of the feature development tokens are allocated, using the usage user portal, to a selected one of the proposed product features. The digital wallet and the blockchain are updated based upon the allocating. An objective analysis is performed on the plurality of proposed product features using the machine learning engine. The blockchain is updated based upon a delivered one of the plurality of the proposed product features. In so doing, conventional software development approaches are improved by permitting users to both suggest product features while committing value to incentivize the development of those product features.

In further aspects of the process, the delivered one of the plurality of proposed features is approved conditional upon a vote of usage users who previously-allocated feature development tokens to the delivered one of the plurality of proposed features. Also, each usage user who previously-allocated feature development tokens to the delivered product feature receives a percentage of total votes commensurate with a percentage of total feature development tokens allocated by the usage user to the delivered product feature. In this manner, those users that have committed value to the generate of the proposed features have the ability to determine whether or not hat proposed features meet the user's requirements. The machine learning engine can be configured to rank the plurality of proposed product features based upon a total number of feature development tokens respectively allocated to each of the plurality of proposed product features and historical feedback from the blockchain.

In certain other aspects of the process, the plurality of feature development tokens allocated to the selected one of the proposed product features is returned to the digital wallet based upon non-delivery of the selected one of the proposed product features. Also, the plurality of feature development tokens are time-limited after the allocating. The usage user portal is configured to permit the usage user to add a proposed product feature to the plurality of proposed product features based upon the usage user having at least a predetermined number of feature development tokens. The blockchain can be configured to include the proposed product feature to the plurality of proposed product features already stored within the blockchain.

A computer hardware system includes a machine learning engine and a hardware processor configured to perform the following executable operations. A stake in a software product is converted into feature development tokens to be stored in the digital wallet. A description of a plurality of proposed product features for the software product and previously-stored within a blockchain are forwarded to a usage user via a usage user portal. A plurality of the feature development tokens are allocated, using the usage user portal, to a selected one of the proposed product features. The digital wallet and the blockchain are updated based upon the allocating. An objective analysis is performed on the plurality of proposed product features using the machine learning engine. The blockchain is updated based upon a delivered one of the plurality of the proposed product features.

In further aspects of the system, the delivered one of the plurality of proposed features is approved conditional upon a vote of usage users who previously-allocated feature development tokens to the delivered one of the plurality of proposed features. Also, each usage user who previously-allocated feature development tokens to the delivered product feature receives a percentage of total votes commensurate with a percentage of total feature development tokens allocated by the usage user to the delivered product feature. The machine learning engine can be configured to rank the plurality of proposed product features based upon a total number of feature development tokens respectively allocated to each of the plurality of proposed product features and historical feedback from the blockchain.

In certain other aspects of the system, the plurality of feature development tokens allocated to the selected one of the proposed product features is returned to the digital wallet based upon non-delivery of the selected one of the proposed product features. Also, the plurality of feature development tokens are time-limited after the allocating. The usage user portal is configured to permit the usage user to add a proposed product feature to the plurality of proposed product features based upon the usage user having at least a predetermined number of feature development tokens. The blockchain can be configured to include the proposed product feature to the plurality of proposed product features already stored within the blockchain.

A computer program product includes computer readable storage medium having stored therein program code. The program code, which when executed by a computer hardware system including a machine learning engine, cause the computer hardware system to perform the following operations. A stake in a software product is converted into feature development tokens to be stored in the digital wallet. A description of a plurality of proposed product features for the software product and previously-stored within a blockchain are forwarded to a usage user via a usage user portal. A plurality of the feature development tokens are allocated, using the usage user portal, to a selected one of the proposed product features. The digital wallet and the blockchain are updated based upon the allocating. An objective analysis is performed on the plurality of proposed product features using the machine learning engine. The blockchain is updated based upon a delivered one of the plurality of the proposed product features.

In further aspects of the computer program product, the delivered one of the plurality of proposed features is approved conditional upon a vote of usage users who previously-allocated feature development tokens to the delivered one of the plurality of proposed features. Also, each usage user who previously-allocated feature development tokens to the delivered product feature receives a percentage of total votes commensurate with a percentage of total feature development tokens allocated by the usage user to the delivered product feature. The machine learning engine can be configured to rank the plurality of proposed product features based upon a total number of feature development tokens respectively allocated to each of the plurality of proposed product features and historical feedback from the blockchain.

In certain other aspects of the computer program product, the plurality of feature development tokens allocated to the selected one of the proposed product features is returned to the digital wallet based upon non-delivery of the selected one of the proposed product features. Also, the plurality of feature development tokens are time-limited after the allocating. The usage user portal is configured to permit the usage user to add a proposed product feature to the plurality of proposed product features based upon the usage user having at least a predetermined number of feature development tokens. The blockchain can be configured to include the proposed product feature to the plurality of proposed product features already stored within the blockchain.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
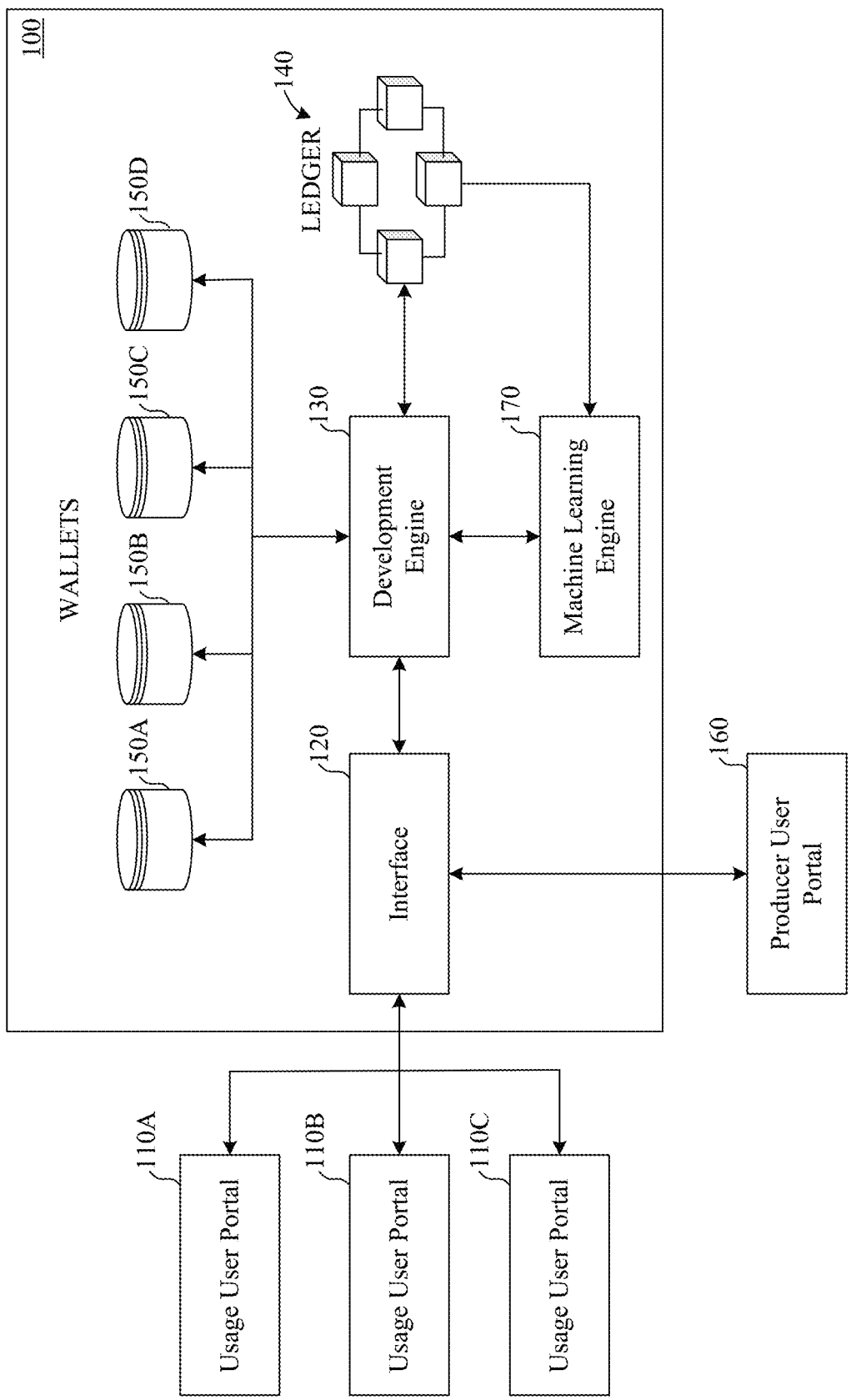
FIG. 1 is a block diagram illustrating an architecture of an example feature prioritization system according to an embodiment of the present invention.
Figure 2:
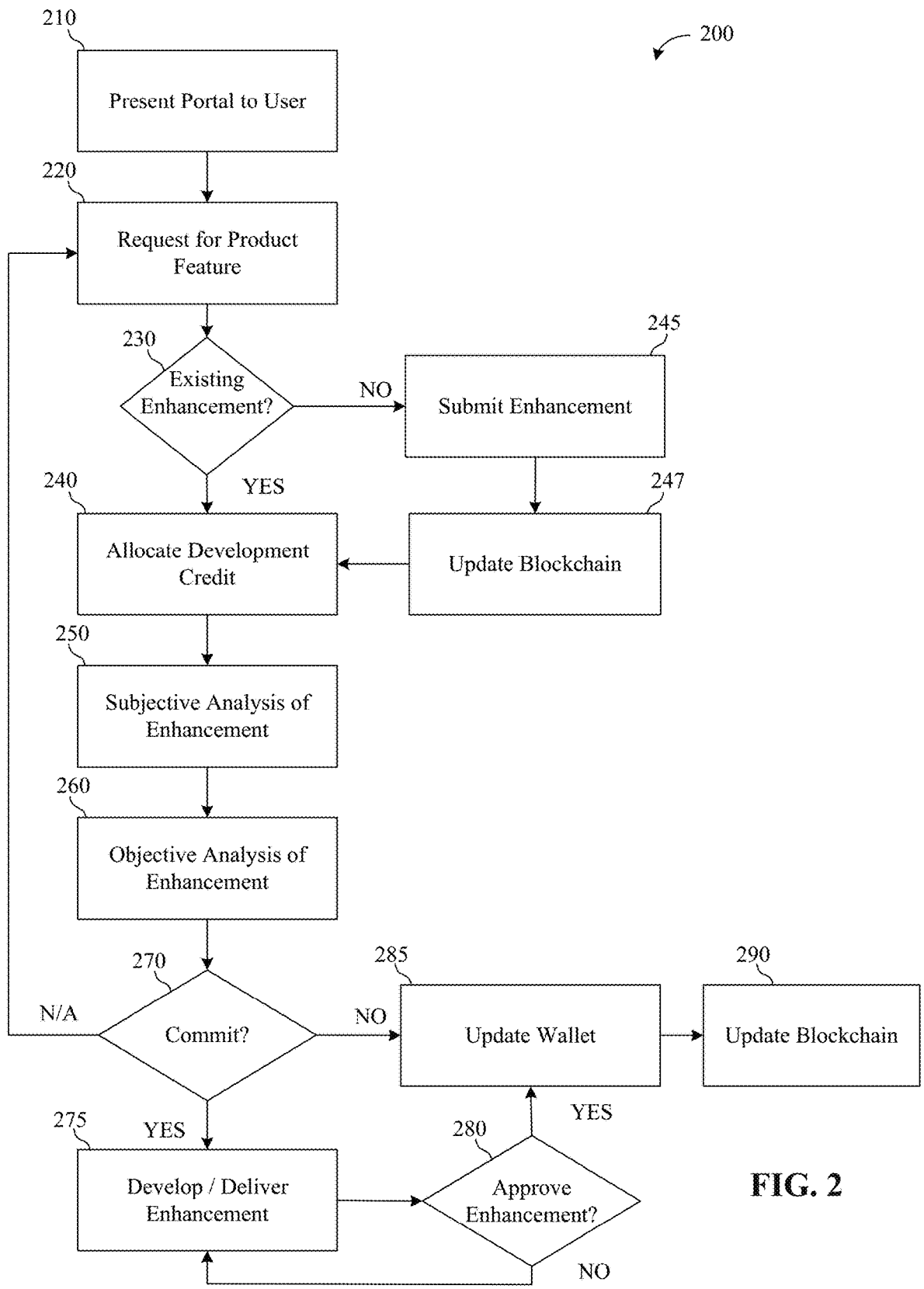
FIG. 2 illustrates an example method using the architecture of FIG. 1 according to an embodiment of the present invention.

Reference is made to FIG. 1 and FIG. 2, which respectively illustrate a feature prioritization system 100 and methodology 200 for using a blockchain 140 to prioritize feature development. Although not limited in this manner, the feature prioritization system 100 includes a distributed ledger 140 (e.g., a blockchain), an interface 120 configured to interact with one or more usage user portals 110A-C and a producer user portal 160, a development engine 130, a machine learning engine 170, and a plurality of digital wallets 150A-D. Although illustrated as being within a single system 100, the individual components of the feature prioritization system 100 can be distributed over a plurality of computer devices. Additionally, the machine learning engine 170 could be within a standalone computer system (not shown) or located in a cloud computing system such as described in FIG. 3.

Although discussed in more detail below, in certain aspects, a stake in a software product is converted into feature development tokens to be stored in the digital wallet 150A-C. A description of a plurality of proposed product features for the software product and previously-stored within the blockchain 140 are forwarded to a usage user via a usage user portal 110A-C. A plurality of the feature development tokens are allocated, using the usage user portal 110A-C, to a selected one of the proposed product features. The digital wallet 150A-C and the blockchain 140 are updated based upon the allocating. An objective analysis is performed on the plurality of proposed product features using the machine learning engine 170. The blockchain 140 is updated based upon a delivered one of the plurality of the proposed product features. In so doing, conventional software development approaches are improved by permitting users to both suggest product features while committing value to incentivize the development of those product features.

In 210, the process 200 begins with the presentation of a usage user portal 110A-C to one or more usage users. As defined herein, the term "usage user" refers to a representative of a user of a software product who has obtained a stake in the software product. Although not limited in this manner, a stake in the software product can include one or more of a plurality of product licenses. For example, a large company (e.g., a global bank) may acquire a number of product licenses (e.g., 100,000) to support the needs of the organization. However, not all of those product licenses are initially needed and that number may grow or decrease depending upon the needs of the organization. According to certain aspects of the feature prioritization system 100, some portion of those stakes can be converted into feature development tokens that are stored within individual digital wallets 150A-C associated with a particular usage user. As will be discussed in greater detail below, these feature development tokens can then be used for prioritizing future product feature development.

To incentivize use of the feature prioritization system 100, in certain aspects, usage users can be compensated for converting some portion of the stakes into feature development tokens. For example, the usage users can be provided with additional functionality, support services, or special items such as additional feature development tokens. The conversion of stakes in feature development tokens using the usage user portal 110A-C is not limited to a particular time period in the process 200. Additionally, unused feature development tokens can also be converted back into the stake (e.g., the product license) using the usage user portal 110A-C.

The usage user portal 110A-C can be configured with access control, which will allow only certain individuals to act as a usage user. Additionally, in certain aspects, the usage user portal 110A-C can be configured to require multiple individuals to agree to and verify a particular commitment.

In 220, using the usage user portal 110A-C, a usage user interacts with the interface 120 of the feature implementation system 100 to request a product feature. This operation can include a number of different aspects. Referring to 230, the usage user may be allowed to suggest a new feature or vote upon an already-defined feature. In certain aspects, the feature implementation system 100 may limit the ability of a usage user to propose a new feature based upon a predetermined condition. For example, the feature implementation system 100 may limit the ability to suggest a new feature only to those usage users having at least a predefined number of feature development tokens in their digital wallet 150A-C. In addition to or alternatively, other conditions may be implemented such as limiting the ability to suggest a new feature only to preselected usage users.

In 245, if a usage user is allowed to suggest a new feature, the usage user portal 110A may present a proposal tool that allows the user age to specify aspects of the designed feature. Proposal tools used for suggesting features are known, and the feature implementation system 100 is not limited as to a particular type of proposal tool so capable.

In 247, a record of the suggested new feature is stored within a distributed ledger 140. A distributed ledger (also referred to herein as a "blockchain") is a particular type of technology. In general, a blockchain is a shared, immutable ledger that facilitates the processing of recording transactions. With a distributed ledger 140, all network participants have access to the distributed ledger 140 and its immutable record of transactions. All transactions are recorded only once, which eliminates duplication of effort. Additionally, no participant of the distributed ledger 140 can change or tamper with a transaction after the transaction has been recorded to the distributed ledger 140. The benefits of a distributed ledger/blockchain 140 is that each member of the network can be assured that the information found in the distributed ledger 140 is accurate and timely. The distributed ledger 140 provides more secure information because consensus on data accuracy is required from all network members and all validated transaction are recorded permanently.

In 240, descriptions of a plurality of proposed product features are forwarded by the feature implementation system 100 to the usage user from the blockchain 140 via the usage user portal 110A-C, and the usage user can vote on a particular product feature. The plurality of proposed product features can include one or more of a previously-defined product feature and/or a product feature that was just defined by the usage user and stored within the blockchain 140. This voting includes allocating some or all of feature development tokens to a selected product feature that the usage user would like implemented from the plurality of proposed product features. As part of the allocation, the development engine 130 removes the allocated feature developments tokens from the usage user's digital wallet 150A-C and records a transaction within the distributed ledger 140 that associates the allocated feature development tokens to the selected product feature.

In certain aspects, the allocation of feature development tokens to a particular product feature can be time-limited. In other words, while feature development tokens can normally be converted back to their normal stake at any time, those features development tokens that are allocated to a particular product feature cannot be withdrawn from being allocated to the particular product feature for a preset period of time or converted back to their normal stake during that time. Along these lines, the feature development tokens allocated to a particular product feature can have an expiration date (i.e., a date after which the feature development tokens are automatically returned to the user's digital wallet 150). All of this information can be recorded within the blockchain 140.

In 250 and 260, subjective and objective analysis are respectively performed. The process 200 is not limited in the order in which these operations are performed. Additionally, these operations can be performed serially or in parallel. The subjective analysis in 250 can include the product provider reviewing those product features to which feature development tokens have been allocated. The subjective analysis is not limited as to a particular type and include one or more of the following: a vote, a majority agreement, a plurality agreement, some allotment of active voters (yes versus no) some allotment of all voters (yes vs no with minimum of 50% of people responding), a delegated individual for agreement, and other kinds of components.

The objective analysis in 260 can include performing a prescriptive and predictive analysis of each product features to which feature development tokens have been allocated. Although not limited in this manner, the objective analysis is performed using a machine learning engine 170 that can leverage past data about prior product features contained within the blockchain 140. For example, the machine learning engine 170 may use data from prior implemented product features for similar software to predict the amount of resources (e.g., man-hours) it would take to implement a particular product feature. The machine learning engine 170 could also leverage pass usage metrics from prior implemented product features to determine how much a selected product feature will actually be used if implemented. As another example, the machine learning engine 170 can leverage historical data from previously-implement product features to determine how easily a product feature can be implemented without an undo number of revisions before usage users approve of a final product. With information such as this, the machine learning engine 170 can produce a ranked list of proposed product features that have had feature development tokens allocated thereto for selection by the product producer. These rankings can be an amalgamation of various factors (e.g., time to complete, likelihood of success, total number of feature development tokens staked) or based upon one factor alone.

In 270, based upon at least one of the subjective and objective analysis and using the producer user portal 160, the product producer can choose to commit to delivering a particular product feature or not deliver a particular product. Depending upon the choice, the development engine 130 is configured to record this commitment to the distributed ledger 140. Alternatively, if the product producer chooses to delay making a commitment one way or the other, the process 200 can return to 220.

In 275, upon committing to deliver the particular product feature, the product producer develops and delivers the particular product feature to at least certain ones of the usage users who previously-allocated feature development tokens to the selected product feature. In 285 and via the usage user portals 110A-C, the usage users are provided with an opportunity to provide feedback to the product producer as well as vote on the completeness of the product feature. This feedback in not limited to a particular type and can include surveys, quick feedback windows, voting, and rankings.

In certain aspects, each usage user who previously-allocated feature development tokens to the delivered product feature receives a percentage of total votes commensurate with a percentage of total feature development tokens allocated by the usage user to the delivered product. For example, if user A allocates 5 tokens, user B allocates 3 tokens, and user C allocates 2 tokens, user A will receive 50% of the votes, user B will receive 30% of the votes, and user C will receive 20% of the votes. If, based upon a predetermined percentage of votes (e.g., 60%) agreeing that the delivered product feature meets the intended requirements of the product feature, the delivered product feature is approved, and the process 200 proceeds to 285. Otherwise, usage users can optionally provide the product producer with feedback via the usage user portal 110A-C, and process returns to 275 in which the product producer and can work to further improve the product feature.

In 285, one or more of the digital wallets 150A-C are updated. If the process 200 proceeded from a decision in 270, by the product producer, to not commit to a particular product feature, each digital wallet 150A-C associated with a respective usage user is updated to return the feature development tokens previously-allocated by those usage users to the particular product feature. Alternatively, if the process 200 proceeded from a determination in 280 that the particular product feature has been approved, the feature development tokens previously-allocated to the particular product feature are automatically transferred to the digital wallet 150D associated with the product producer.

In 290, the blockchain 290 updated. If the process 200 proceeded from a decision in 270, by the product producer, to not commit to a particular product feature, the blockchain 290 can be updated to indicate that the particular product feature was not selected by the product producer and will no longer be shown to usage users as an option to which allocate feature development tokens. Alternatively, if the process 200 proceeded from a determination in 280 that the particular product feature has been approved, the blockchain 290 can be updated to indicate that the particular product feature was produced by the product producer and will no longer be shown to usage users as an option to which allocate feature development tokens. This information stored within the blockchain 290 can subsequently be used by the machine learning engine 170 during the objective analysis of future product features in 260.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

Figure 3:
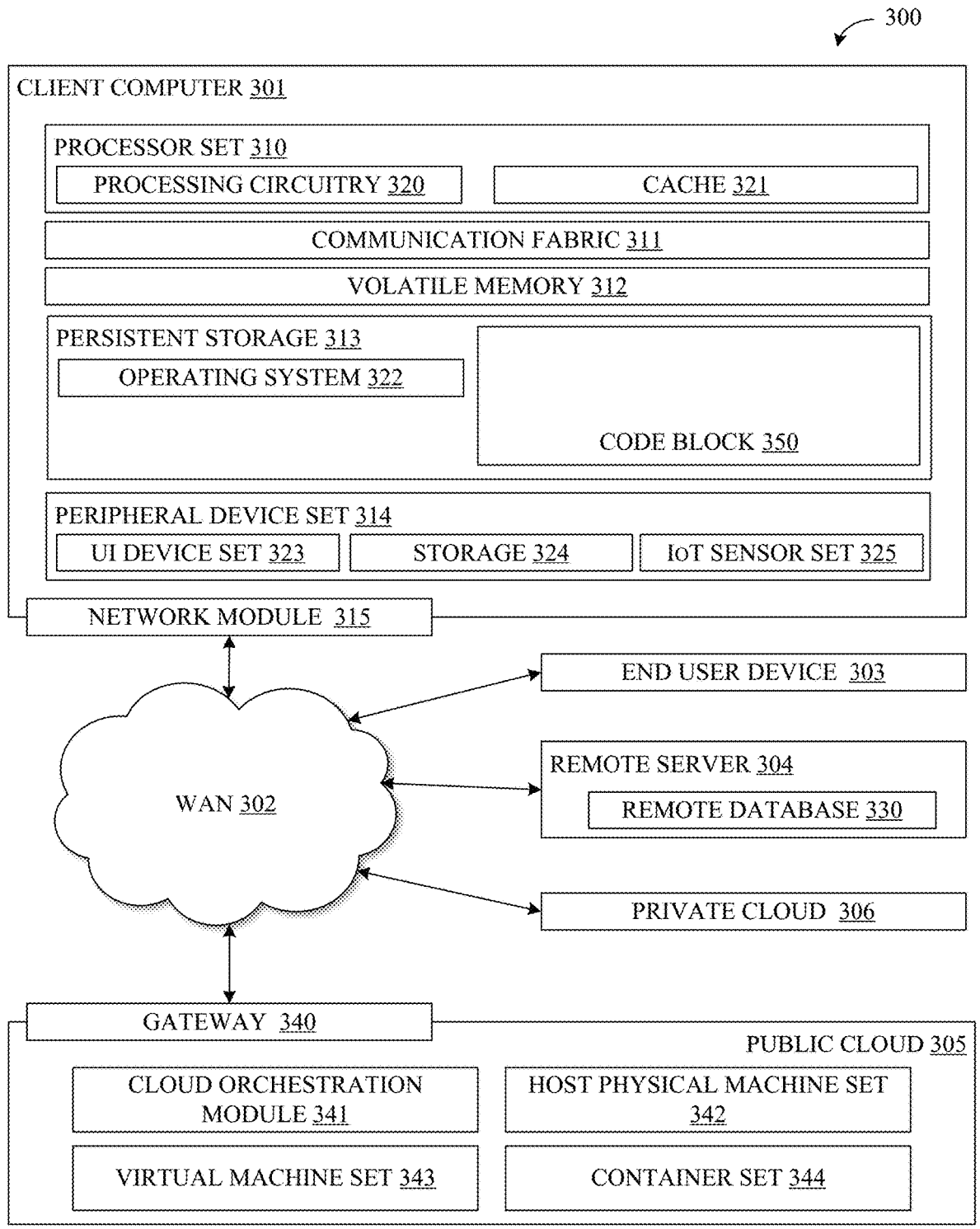
FIG. 3 is a block diagram illustrating an example of computer environment for implementing portions of the methodology of FIG. 2.

Referring to FIG. 3, computing environment 300 contains an example of an environment for the execution of at least some of the computer code involved in performing the inventive methods, such as feature implementation system code block 350 for implementing the operations of the feature implementation system 100. Computing environment 300 includes, for example, computer 301, wide area network (WAN) 302, end user device (EUD) 303, remote server 304, public cloud 305, and private cloud 306. In certain aspects, computer 301 includes processor set 310 (including processing circuitry 320 and cache 321), communication fabric 311, volatile memory 312, persistent storage 313 (including operating system 322 and feature implementation system code block 350), peripheral device set 314 (including user interface (UI), device set 323, storage 324, and Internet of Things (IOT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. However, to simplify this presentation of computing environment 300, detailed discussion is focused on a single computer, specifically computer 301. Computer 301 may or may not be located in a cloud, even though it is not shown in a cloud in FIG. 3 except to any extent as may be affirmatively indicated.

Processor set 310 includes one, or more, computer processors of any type now known or to be developed in the future. As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In certain computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods discussed above in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in feature implementation system code block 350 in persistent storage 313.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Communication fabric 311 is the signal conduction paths that allow the various components of computer 301 to communicate with each other. Typically, this communication fabric 311 is made of switches and electrically conductive paths, such as the switches and electrically conductive paths that make up busses, bridges, physical input/output ports and the like. Other types of signal communication paths may be used for the communication fabric 311, such as fiber optic communication paths and/or wireless communication paths.

Volatile memory 312 is any type of volatile memory now known or to be developed in the future. Examples include dynamic type random access memory (RAM) or static type RAM. Typically, the volatile memory 312 is characterized by random access, but this is not required unless affirmatively indicated. In computer 301, the volatile memory 312 is located in a single package and is internal to computer 301. In addition to alternatively, the volatile memory 312 may be distributed over multiple packages and/or located externally with respect to computer 301.

Persistent storage 313 is any form of non-volatile storage for computers that is now known or to be developed in the future. The non-volatility of the persistent storage 313 means that the stored data is maintained regardless of whether power is being supplied to computer 301 and/or directly to persistent storage 313. Persistent storage 313 may be a read only memory (ROM), but typically at least a portion of the persistent storage 313 allows writing of data, deletion of data and re-writing of data. Some familiar forms of persistent storage 313 include magnetic disks and solid state storage devices. Operating system 322 may take several forms, such as various known proprietary operating systems or open source Portable Operating System Interface type operating systems that employ a kernel. The code included in feature implementation system code block 350 typically includes at least some of the computer code involved in performing the inventive methods.

Peripheral device set 314 includes the set of peripheral devices for computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet.

In various aspects, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some aspects, storage 324 may take the form of a quantum computing storage device for storing data in the form of qubits. In aspects where computer 301 is required to have a large amount of storage (for example, where computer 301 locally stores and manages a large database) then this storage 324 may be provided by peripheral storage devices designed for storing very large amounts of data, such as a storage area network (SAN) that is shared by multiple, geographically distributed computers. Internet-of-Things (IOT) sensor set 325 is made up of sensors that can be used in IoT applications. For example, one sensor may be a thermometer and another sensor may be a motion detector.

Network module 315 is the collection of computer software, hardware, and firmware that allows computer 301 to communicate with other computers through a Wide Area Network (WAN) 302. Network module 315 may include hardware, such as modems or Wi-Fi signal transceivers, software for packetizing and/or de-packetizing data for communication network transmission, and/or web browser software for communicating data over the internet. In certain aspects, network control functions and network forwarding functions of network module 315 are performed on the same physical hardware device. In other aspects (for example, aspects that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any Wide Area Network (for example, the internet) capable of communicating computer data over non-local distances by any technology for communicating computer data, now known or to be developed in the future. In some aspects, the WAN 302 may be replaced and/or supplemented by local area networks (LANs) designed to communicate data between devices located in a local area, such as a Wi-Fi network. The WAN 302 and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In certain aspects, EUD 303 may be a client device, such as thin client, heavy client, mainframe computer, desktop computer and so on.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein. As defined herein, the term "user" means a person (i.e., a human being).

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304. As defined herein, the term "server" means a data processing system configured to share services with one or more other data processing systems.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

VCEs can be stored as "images," and a new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other aspects, a private cloud 306 may be disconnected from the internet entirely (e.g., WAN 302) and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this aspect, public cloud 305 and private cloud 306 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

As another example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. Each block in the flowchart or block diagrams may represent a module, segment, or portion of instructions, which comprises one or more executable instructions for implementing the specified logical function(s).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "if," "when," "upon," "in response to," and the like are not to be construed as indicating a particular operation is optional. Rather, use of these terms indicate that a particular operation is conditional. For example and by way of a hypothetical, the language of "performing operation A upon B" does not indicate that operation A is optional. Rather, this language indicates that operation A is conditioned upon B occurring.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented method within a computer hardware system including a machine learning engine, comprising: converting a stake in a software product into feature development tokens to be stored in a digital wallet; forwarding, to a usage user via a usage user portal, a description of a plurality of proposed product features for the software product and previously-stored within a blockchain; allocating, using the usage user portal, a plurality of the feature development tokens to a selected one of the proposed product features; updating the digital wallet and the blockchain based upon the allocating; performing, using the machine learning engine, an objective analysis on the plurality of proposed product features; and updating the blockchain based upon a delivered one of the plurality of the proposed product features.

2. The method of claim 1, wherein the delivered one of the plurality of proposed features is approved conditional upon a vote of usage users who previously-allocated feature development tokens to the delivered one of the plurality of proposed features.

3. The method of claim 2, wherein each usage user who previously-allocated feature development tokens to the delivered product feature receives a percentage of total votes commensurate with a percentage of total feature development tokens allocated by the usage user to the delivered product feature.

4. The method of claim 1, wherein the machine learning engine is configured to rank the plurality of proposed product features based upon a total number of feature development tokens respectively allocated to each of the plurality of proposed product features and historical feedback from the blockchain.

5. The method of claim 1, wherein the plurality of feature development tokens allocated to the selected one of the proposed product features is returned to the digital wallet based upon non-delivery of the selected one of the proposed product features.

6. The method of claim 5, wherein the plurality of feature development tokens are time-limited after the allocating.

7. The method of claim 1, wherein the usage user portal is configured to permit the usage user to add a proposed product feature to the plurality of proposed product features based upon the usage user having at least a predetermined number of feature development tokens.

8. The method of claim 1, wherein the blockchain is configured to include the proposed product feature to the plurality of proposed product features already stored within the blockchain.

9. A computer hardware system including a machine learning engine, comprising: a hardware processor configured to perform the following executable operations: converting a stake in a software product into feature development tokens to be stored in a digital wallet; forwarding, to a usage user via a usage user portal, a description of a plurality of product features for the software product and previously-stored within a blockchain; allocating, using the usage user portal, a plurality of the feature development tokens to a selected one of the proposed product features; updating the digital wallet and the blockchain based upon the allocating; performing, using the machine learning engine, an objective analysis on the plurality of proposed product features; and updating the blockchain based upon a delivered one of the plurality of the proposed product features.

10. The system of claim 9, wherein the delivered one of the plurality of proposed features is approved conditional upon a vote of usage users who previously-allocated feature development tokens to the delivered one of the plurality of proposed features.

11. The system of claim 10, wherein each usage user who previously-allocated feature development tokens to the delivered product feature receives a percentage of total votes commensurate with a percentage of total feature development tokens allocated by the usage user to the delivered product feature.

12. The system of claim 9, wherein the machine learning engine is configured to rank the plurality of proposed product features based upon a total number of feature development tokens respectively allocated to each of the plurality of proposed product features and historical feedback from the blockchain.

13. The system of claim 9, wherein the plurality of feature development tokens allocated to the selected one of the proposed product features is returned to the digital wallet based upon non-delivery of the selected one of the proposed product features.

14. The system of claim 13, wherein the plurality of feature development tokens are time-limited after the allocating.

15. The system of claim 9, wherein the usage user portal is configured to permit the usage user to add a proposed product feature to the plurality of proposed product features based upon the usage user having at least a predetermined number of feature development tokens.

16. The system of claim 9, wherein the blockchain is configured to include the proposed product feature to the plurality of proposed product features already stored within the blockchain.

17. A computer program product, comprising: a computer readable storage medium having stored therein program code, the program code, which when executed by the computer hardware system including a machine learning engine, cause the computer hardware system to perform: converting a stake in a software product into feature development tokens to be stored in a digital wallet; forwarding, to a usage user via a usage user portal, a description of a plurality of product features for the software product and previously-stored within a blockchain; allocating, using the usage user portal, a plurality of the feature development tokens to a selected one of the proposed product features; updating the digital wallet and the blockchain based upon the allocating; performing, using the machine learning engine, an objective analysis on the plurality of proposed product features; and updating the blockchain based upon a delivered one of the plurality of the proposed product features.

18. The computer program product of claim 17, wherein the delivered one of the plurality of proposed features is approved conditional upon a vote of usage users who previously-allocated feature development tokens to the delivered one of the plurality of proposed features.

19. The computer program product of claim 18, wherein each usage user who previously-allocated feature development tokens to the delivered product feature receives a percentage of total votes commensurate with a percentage of total feature development tokens allocated by the usage user to the delivered product feature.

20. The computer program product of claim 17, wherein the machine learning engine is configured to rank the plurality of proposed product features based upon a total number of feature development tokens respectively allocated to each of the plurality of proposed product features and historical feedback from the blockchain.

21. The computer program product of claim 17, wherein the plurality of feature development tokens allocated to the selected one of the proposed product features is returned to the digital wallet based upon non-delivery of the selected one of the proposed product features.

22. The computer program product of claim 21, wherein the plurality of feature development tokens are time-limited after the allocating.

23. The computer program product of claim 17, wherein the usage user portal is configured to permit the usage user to add a proposed product feature to the plurality of proposed product features based upon the usage user having at least a predetermined number of feature development tokens.

24. The computer program product of claim 17, wherein the blockchain is configured to include the proposed product feature to the plurality of proposed product features already stored within the blockchain.

25. A computer-implemented method within a computer hardware system including a machine learning engine, comprising: converting a stake in a software product into feature development tokens to be stored in the digital wallet; forwarding, to a usage user via a usage user portal, a description of a plurality of proposed product features for the software product and previously-stored within a blockchain; allocating, using the usage user portal, a plurality of the feature development tokens to a selected one of the proposed product features; updating the digital wallet and the blockchain based upon the allocating; performing, using the machine learning engine, an objective analysis on the plurality of proposed product features; and updating the blockchain based upon a delivered one of the plurality of the proposed product features, wherein the delivered one of the plurality of proposed features is approved conditional upon a vote of usage users who previously-allocated feature development tokens to the delivered one of the plurality of proposed features, each usage user who previously-allocated feature development tokens to the delivered product feature receives a percentage of total votes commensurate with a percentage of total feature development tokens allocated by the usage user to the delivered product feature, the usage user portal is configured to permit the usage user to add a proposed product feature to the plurality of proposed product features based upon the usage user having at least a predetermined number of feature development tokens, the blockchain is configured to include the proposed product feature to the plurality of proposed product features already stored within the blockchain, and the plurality of feature development tokens are time-limited after the allocating.

* * * * *